March 10, 1959 R. C. WILLIAMS 2,877,059
TRACK ROLLER
Filed March 24, 1955
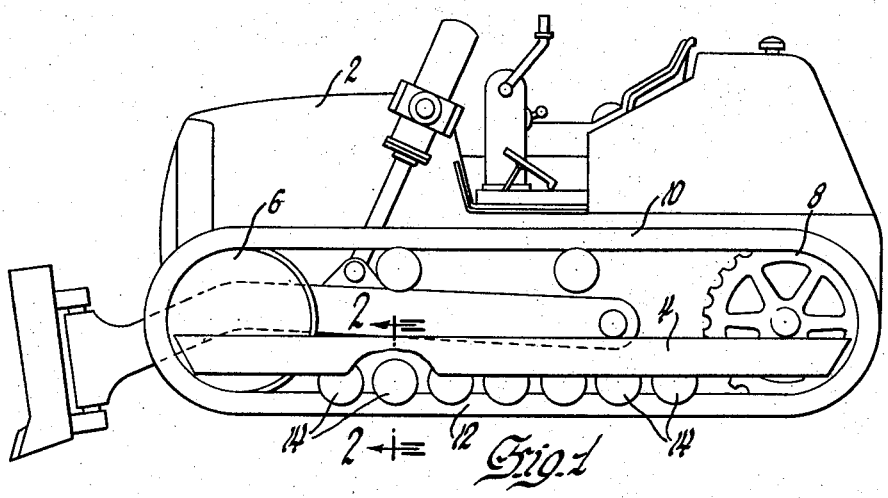
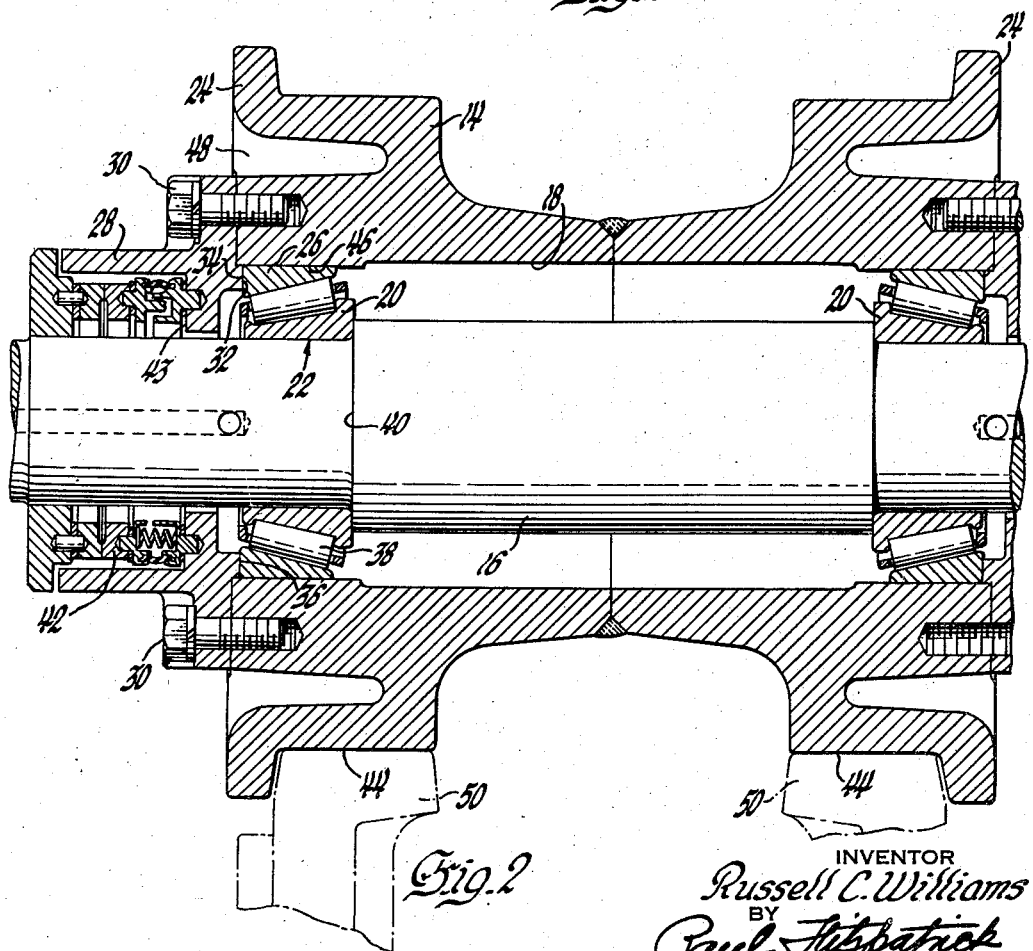
INVENTOR
Russell C. Williams
BY
Paul Fitzpatrick
ATTORNEY

United States Patent Office 2,877,059
Patented Mar. 10, 1959

2,877,059

TRACK ROLLER

Russell C. Williams, Rocky River, Ohio, assignor to General Motors Corporation, Detroit, Mich., a corporation of Delaware Application March 24, 1955, Serial No. 496,435

2 Claims. (Cl. 305—1)

This invention relates to track laying vehicles and more particularly to track supporting rollers adapted for mounting on the track frames of such vehicles.

Track laying vehicles such as crawler tractors are customarily provided with laterally spaced track frames which extend between longitudinally spaced drive sprockets and idler wheels. An endless track partly surrounds the drive sprocket and idler wheel and extends therebetween to provide an elongated ground engaging section adapted for progressive movement over terrain. To provide rolling support for the elongated intermediate section of track which engages the ground, it is desirable that a plurality of relatively small diameter track rollers be rotatably disposed on transverse axes at longitudinally spaced intervals on the underside of the track frame. These rollers rotatively engage the inner surface of the ground engaging portion of the track as it progresses forwardly along the ground. Since crawler tractors are intended for operation over rugged terrain, the track rollers are subject to severe impact and hammering action by the individual track links. In the past, because of this hammering action, the service life of track rollers in many cases has been extremely short. Thus, in cases where anti-friction bearings are press fitted in the inner periphery of the rollers, the hammering of the track links on the outer periphery of the rollers produces a peening action which causes bell-mounting of the inner periphery. As soon as the bell-mounting becomes pronounced, the outer race of the anti-friction bearing is permitted to slip, chatter, and otherwise function improperly.

An object of the present invention is to provide a track roller having integrally formed shock insulating portions.

Another object is to provide a track roller having an inner and outer periphery, wherein the diameter of the inner periphery is substantially unaffected by hammering action imposed on the outer periphery.

A further object is to provide a one-piece track roller of the type described.

Still another object is to provide a track roller having an outer peripheral link engaging portion and an inner peripheral bearing receiving portion aligned in substantially the same plane as the link engaging portion, there being an annular recess formed in the roller radially intermediately of the outer and inner periphery to prevent transfer of impact between the respective peripheries.

These and other objects, advantages and features of the invention will become more fully apparent as reference is had to the accompanying specification and drawings wherein:

Fig. 1 is a side elevational view of a crawler tractor illustrating the location of the track rollers with respect to the endless track and track frame; and Fig. 2 is a rear elevational view, partly in section, of the details of construction of the track roller and associated anti-friction bearings and bearing supports.

Referring now to the drawing and particularly Fig. 1, there is illustrated a crawler tractor 2 which is provided at each of its laterally opposite sides wtih a track frame 4. At its forward end, frame 4 has slidably mounted thereon a track idler wheel 6, while at its rearward end there is provided a track driving sprocket 8. Partially encircling idler wheel 6 and driving sprocket 8 and extending therebetween, is an endless track structure 10 comprising a series of links and shoes. Since the precise construction of track 10 forms no part of the present invention, a detailed description thereof will be omitted. In order to provide rolling support for the intermediate longitudinally extending lower portion 12 of track 10, track frame 4 is provided with a plurality of track rollers 14 which are rotatably supported on the underside of frame 4 at longitudinally spaced intervals.

As seen best in Fig. 2, each of rollers 14 is supported on track frame 4 by means of a cross shaft 16, the opposite ends, not shown, of which are connected on the underside of frame 4 in a conventional manner. Shaft 16 extends through an axial bore 18 formed in roller 14 and is adapted to receive the inner races 20 of laterally spaced roller bearing assemblies 22. Assemblies 22 are disposed in substantial alignment with the opposite side faces 24 of roller 14. Axial bore 18 of roller 14, in turn, receives the outer race 26 of each bearing assembly 22. To maintain the cross shaft 16, roller 14 and bearing assembly 22 in proper axial relationship, an annular cap structure 28 is disposed against the side face 24 of roller 14 and retained thereon by means of bolts 30. It will be apparent that when cap structure 28 is drawn up tightly against the side face 24, the shoulder 32 formed by the pilot portion 34 will bear against the side face 36 of outer race 26 of bearing assembly 22. Consequently, bearing rollers 38 will exert an axially inward thrust on inner race 20, urging the latter against the shoulder 40 of cross shaft 16. Consequently, roller 14 is maintained against axial movement relative to shaft 16 but is freely rotatable therearound. A suitable annular rotary seal 42 is interposed between the outwardly facing portion 43 of cap structure 28 and the outer end of shaft 16 to prevent escape of lubricant from the interior of axial bore 18.

In order to reduce transmission of shock from the link engaging portions 44 of roller 14 to the inside diameter 46 thereof in accordance with the present invention, each side of roller 14 is provided with an annular groove 48 which is radially spaced intermediately between the portion 44 and the inside diameter 46. As will be seen in Fig. 2, groove 48 extends axially inwardly to a depth somewhat greater than the depth of the anti-friction bearing assemblies 22. Thus, hammering impact of the links 50 on the link engaging portions 44 is cushioned by the annular gap 48, and therefore, is not transmitted directly to that portion of the inside diameter 46 which surrounds the outer race 26. Consequently, peening action and attendant bell-mouthing of the inside diameter 46 is substantially reduced.

From the foregoing, it will be seen that a novel, efficient and economical track roller construction has been devised which will substantially prolong the service life of the bearing support structures utilized in connection therewith.

While but one embodiment of the invention has been shown and described, it will be apparent that other changes and modifications will be made therein. It is, therefore, understood that it is not intended to limit the invention to the embodiment shown but only by the scope of the claims which follow.

What is claimed is.

1. In a roller structure for tracked vehicles, the combination of a shaft, a roller surrounding said shaft, said roller having an outer peripheral track-engaging portion, an anti-friction bearing disposed between said shaft and said roller in substantial radial alignment with said track-engaging portion, and an axial extending annular recess in said roller radially between said track-engaging portion and said bearing, said recess extending axially inwardly at least to a point radially aligned with the axially inner edge of said bearing.

2. In a roller structure for tracked vehicles, the combination of a shaft, a roller surrounding said shaft, said roller having an outer peripheral track-engaging portion, an anti-friction bearing disposed between said shaft and said roller in substantial radial alignment with said track-engaging portion, and an axially extending annular recess in said roller radially between said track-engaging portion and said bearing, said recess extending axially inwardly to a point beyond the axially inner edge of said bearing.

References Cited in the file of this patent

UNITED STATES PATENTS

| | | |
|---|---|---|
| 2,666,674 | Deffenbaugh | Jan. 19, 1954 |

FOREIGN PATENTS

| | | |
|---|---|---|
| 501,575 | Great Britain | Feb. 28, 1939 |
| 925,572 | Germany | Feb. 24, 1955 |

UNITED STATES PATENT OFFICE

CERTIFICATE OF CORRECTION

Patent No. 2,877,059                                          March 10, 1959

Russell C. Williams

It is hereby certified that error appears in the printed specification of the above numbered patent requiring correction and that the said Letters Patent should read as corrected below.

Column 1, lines 41 and 42, for "bell-mounting", each occurrence, read -- bell-mouthing --; column 3, line 1, for "axial" read -- axially --.

Signed and sealed this 18th day of August 1959.

(SEAL)
Attest:

KARL H. AXLINE                                        ROBERT C. WATSON
Attesting Officer                                 Commissioner of Patents